US012771786B2

(12) United States Patent
Joshi et al.

(10) Patent No.: US 12,771,786 B2
(45) Date of Patent: Oct. 20, 2026

(54) SYSTEM AND METHOD FOR PLAYING AN AUDIO FILE OF A PRONUNCIATION OF A NAME OF AN INBOUND-CALLER VIA A COMPUTERIZED-DEVICE OF A RECIPIENT

(71) Applicant: NICE LTD., Ra'anana (IL)

(72) Inventors: Sameer Joshi, Pune (IN); Basavraj Ghuli, Pune (IN)

(73) Assignee: NICE LTD, Ra'anana (IL)

(*) Notice: Subject to any disclaimer, the term of this patent is extended or adjusted under 35 U.S.C. 154(b) by 286 days.

(21) Appl. No.: 18/776,292

(22) Filed: Jul. 18, 2024

(65) Prior Publication Data

US 2026/0025462 A1 Jan. 22, 2026

(51) Int. Cl.

*H04M 3/436* (2006.01)
*G10L 13/08* (2013.01)
*H04M 3/523* (2006.01)

(52) U.S. Cl.

CPC ............ *H04M 3/436* (2013.01); *G10L 13/08* (2013.01); *H04M 3/5232* (2013.01)

(58) Field of Classification Search

CPC ..... H04M 3/436; H04M 3/5232; G10L 13/08; G10L 15/26

USPC .......................................................... 455/415

See application file for complete search history.

(56) References Cited

U.S. PATENT DOCUMENTS 7,047,195 B2 5/2006 Koizumi et al.
2004/0264654 A1* 12/2004 Reding ............... H04Q 3/0029 379/88.22

* cited by examiner

*Primary Examiner* — Huy C Ho
(74) *Attorney, Agent, or Firm* — SOROKER NORDMAN RIBA

(57) ABSTRACT

A computerized-system for playing an audio-file of a pronunciation of a name of an inbound-caller via a computerized-device of a recipient. The computerized-system includes: an inbound-routing software, a CRM software, a name-pronunciation engine; and processors. The processors are configured to: (i) detect an inbound-interaction to the inbound-routing software; (ii) retrieve a name of the inbound-caller from the CRM software based on an ANI number of the inbound-caller; (iii) forward the retrieved name of the inbound-caller to a name-pronunciation engine to fetch an audio-file with pronunciation of the name of the inbound-caller; (iv) check an identity of a recipient of the inbound-interaction; (v) detect routing of the inbound-interaction to the recipient by the inbound-routing software; (vi) transmit the audio-file to the computerized-device of the recipient based on the identity thereof; and (vii) play the audio-file with the pronunciation of the name by a media-player before the recipient answers the inbound-interaction.

8 Claims, 13 Drawing Sheets

500

600

SYSTEM AND METHOD FOR PLAYING AN AUDIO FILE OF A PRONUNCIATION OF A NAME OF AN INBOUND-CALLER VIA A COMPUTERIZED-DEVICE OF A RECIPIENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of audio file generation and transfers and more particularly, the present disclosure relates to the field of distribution of audio files over a computer network, such as the Internet to a computerized-device of a recipient before the recipient answers a call.

BACKGROUND

The name of a person is a label that carries profound implications for their identity and existence. It is a symbol that society uses to distinguish individuals, yet it is so much more than a mere identifier. The name of a person is a philosophical gateway to the exploration of identity, language, society, and the intricate connections between them. Due to various operational reasons, like 'follow the sun' model or low labor cost, the contact center agents are not the native language speaker. During agent onboarding, the agents get trained for accent neutralization and pronouncing of the most common names.

When it comes to pronouncing of the name of a person, there is huge scope where the recipient experience can be enhanced. For example, the name Xavier may be pronounced as ex-zay-vee-err or zeiviar or Jay-vee-err. The name Subramaniam may be pronounced as suu—bruh—muhn—yuhm. In Australia Megan, Magen and Meghan are three different names, while in the US they all are pronounced as Meg-un. The name Jose may be pronounced as hoh-zeh in English, Joo-zeh in Portuguese, and ho-she in Spanish.

Pronouncing a name wrongly could be conversation spoiler, that too if agent want to up sell or cross sell to the customer at times, the caller may even feel offended because their name was wrongly pronounced.

Accordingly, there is a need for a technical solution for playing an audio file of a pronunciation of a name of an inbound-caller via a computerized-device of a recipient before the inbound interaction begins.

SUMMARY

There is thus provided, in accordance with some embodiments of the present disclosure, a computerized-system for playing an audio file of a pronunciation of a name of an inbound-caller via a computerized-device of a recipient.

Furthermore, in accordance with some embodiments of the present disclosure, in a computerized system that includes an inbound routing software, a Customer Relationship Management (CRM) software, a name pronunciation engine; and one or more processors, the one or more processors may be configured to: (i) detect an inbound-interaction to the inbound routing software; (ii) retrieve a name of the inbound-caller of the inbound-interaction from the CRM software based on an Automatic Number Identification (ANI) number of the inbound-caller. The name of the inbound-caller is in text-format; (iii) forward the retrieved name of the inbound-caller to a name pronunciation engine. The name pronunciation engine is configured to fetch an audio file with pronunciation of the name of the inbound-caller; (iv) check an identity of a recipient of the inbound-interaction that has been assigned by the inbound routing software; (v) automatically detect routing of the inbound-interaction to the recipient of the inbound-interaction by the inbound routing software; (vi) automatically transmit the audio file with the pronunciation of the name of the inbound-caller to the computerized-device of the recipient based on the identity thereof; and (vii) automatically play the audio file with the pronunciation of the name of the inbound-caller by a media-player that is running on the computerized-device of the recipient before the recipient answers the inbound-interaction.

Furthermore, in accordance with some embodiments of the present disclosure, the audio file with pronunciation of the name of the inbound-caller may be fetched from a media server.

Furthermore, in accordance with some embodiments of the present disclosure, the audio file with pronunciation of the name of the inbound-caller may have been recorded and stored in the media server during first communication with the inbound-caller.

Furthermore, in accordance with some embodiments of the present disclosure, the inbound routing software may be an Automatic Call Distribution (ACD) software.

Furthermore, in accordance with some embodiments of the present disclosure, the name pronunciation engine is configured to fetch the audio file from a media server based on a positive indication of audio file existence and file-path of the audio file in a record of the recipient in the CRM software.

Furthermore, in accordance with some embodiments of the present disclosure, the name pronunciation engine may be configured to fetch the audio file from a Text To Speech (TTS) server when there is a negative indication of audio file existence in the CRM software. The audio file may be generated by the TTS server based on the name of the inbound-caller in text-format that has been received from the name pronunciation engine.

Furthermore, in accordance with some embodiments of the present disclosure, the audio file with pronunciation of the name of the inbound-caller may have been generated by a name extraction engine after a previous interaction with the inbound-caller has been marked as not correctly pronounced. The name extraction engine may include: (i) converting the audio file into transcription; (ii) detecting a timestamp of a sentence in the transcript where the inbound-caller is correcting the recipient as to the pronunciation of the name; (iii) extracting the name of the inbound-caller from the transcription; (iv) using the TTS server to convert the extracted name of the inbound-caller from the phonetic transcript text to audio file; and (v) storing the audio file with pronunciation of the name of the inbound-caller. The transcript may be a phonetic transcript text.

There is further provided, in accordance with some embodiments of the present disclosure, a computerized-method for playing an audio file of a pronunciation of a name of an inbound-caller via a computerized-device of a recipient.

Furthermore, in accordance with some embodiments of the present disclosure, the computerized-method may include: (i) detecting by one or more processors an inbound-interaction to the inbound routing software; (ii) retrieving by the one or more processors a name of the inbound-caller of the inbound-interaction from the CRM software based on an Automatic Number Identification (ANI) number of the inbound-caller. The name of the inbound-caller is in text-format; (iii) forwarding by the one or more processors the retrieved name of the inbound-caller to a name pronunciation engine. The name pronunciation engine is configured to fetch an audio file with pronunciation of the name of the inbound-caller; (iv) checking by the one or more processors an identity of a recipient of the inbound-interaction that has been assigned by the inbound routing software; (v) detecting by the one or more processors routing of the inbound-interaction to the recipient of the inbound-interaction by the inbound routing software; (vi) automatically transmitting by the one or more processors the audio file with the pronunciation of the name of the inbound-caller to the computerized-device of the recipient based on the identity thereof; and (vii) automatically playing the audio file with the pronunciation of the name of the inbound-caller by a media-player that is running on the computerized-device of the recipient before the recipient answers the inbound-interaction.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Figure 1A:
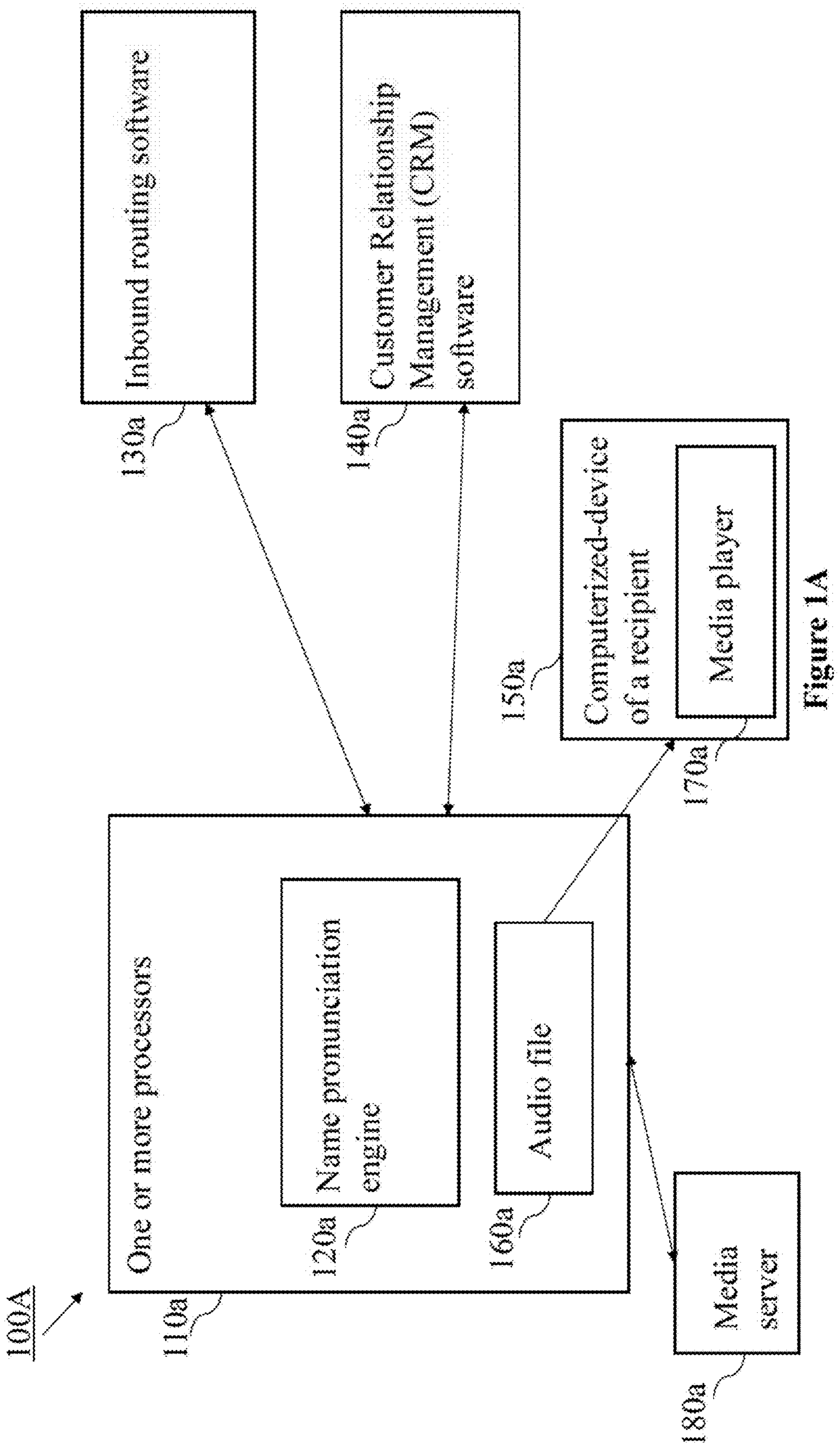
FIGS. 1A-1C schematically illustrate a high-level diagram of a system for playing an audio file of a pronunciation of a name of an inbound-caller via a computerized-device of a recipient, in accordance with some embodiments of the present disclosure.

FIG. 1A schematically illustrates a high-level diagram of a system 100A for playing an audio file of a pronunciation of a name of an inbound-caller via a computerized-device of a recipient, in accordance with some embodiments of the present disclosure.

According to some embodiments of the present disclosure, a system, such as system 100A may play a pronunciation of a caller before the recipient starts the interaction. For example, when the caller is a customer, an agent in a contact center may be played the name pronunciation of the customer before Real-time Transport Protocol (RTP) of the computerized-device of the agent is connected or before the agent get a screen pop-up with the customer details on the agent's computerized-device.

According to some embodiments of the present disclosure, one or more processors **110*a* may be configured to detect an inbound-interaction that was entered to the inbound routing software 130*a* and to retrieve a name of the inbound-caller of the inbound-interaction from a CRM software 140*a*** based on an Automatic Number Identification (ANI) number of the inbound-caller. The retrieved name of the inbound-caller is in text-format.

According to some embodiments of the present disclosure, for example, the inbound routing software may be an Automatic Call Distribution (ACD) software.

According to some embodiments of the present disclosure, the retrieved name of the inbound-caller may be forwarded to a name pronunciation engine **120*a*. The name pronunciation engine may be configured to fetch the audio file 160*a* from a media server 180*a* based on a positive indication of audio file existence and file-path of the audio file in a record of the recipient in the CRM software 140*a***.

According to some embodiments of the present disclosure, the audio file **160*a* with pronunciation of the name of the inbound-caller may be fetched from a media server 180*a*. The audio file 160*a* with a correct pronunciation of the name of the inbound-caller may have been recorded and stored in the media server 180*a*** during a first communication with the inbound-caller.

According to some embodiments of the present disclosure, for example, a caller's name may be recorded in the caller's own voice and the recording, i.e., audio-file, may be stored in the media server 180*a*.

According to some embodiments of the present disclosure, optionally, the audio file with pronunciation of the name of the customer may be retrieved from the media server 180*a* and played on the computerized-device of the agent before an agent conducts an outbound call to a customer.

According to some embodiments of the present disclosure, the retrieved name of the inbound-caller, in text-format, from the CRM software 140*a*, may be forwarded to a name pronunciation engine 120*a*. The name pronunciation engine 120*a* may be configured to fetch the audio file 160*a* with pronunciation of the name of the inbound-caller from the media server 180*a*.

According to some embodiments of the present disclosure, the identity of a recipient of the inbound-interaction that has been assigned by the inbound routing software 130*a* may be checked and then routing of the inbound-interaction to the recipient of the inbound-interaction by the inbound routing software 130*a* may be automatically detected while the inbound-interaction is waiting in a queue of inbound-interactions.

According to some embodiments of the present disclosure, after the detection of the routing of the inbound-interaction to the recipient, the audio file 160*a* with the pronunciation of the name of the inbound-caller may be automatically transmitted to the computerized-device of the recipient 150*a* based on the identity of the recipient. The audio file with the pronunciation of the name of the inbound-caller may be played by a media-player 170*a* that is running on the computerized-device of the recipient 150*a* before the recipient answers the inbound-interaction.

Figure 1B:
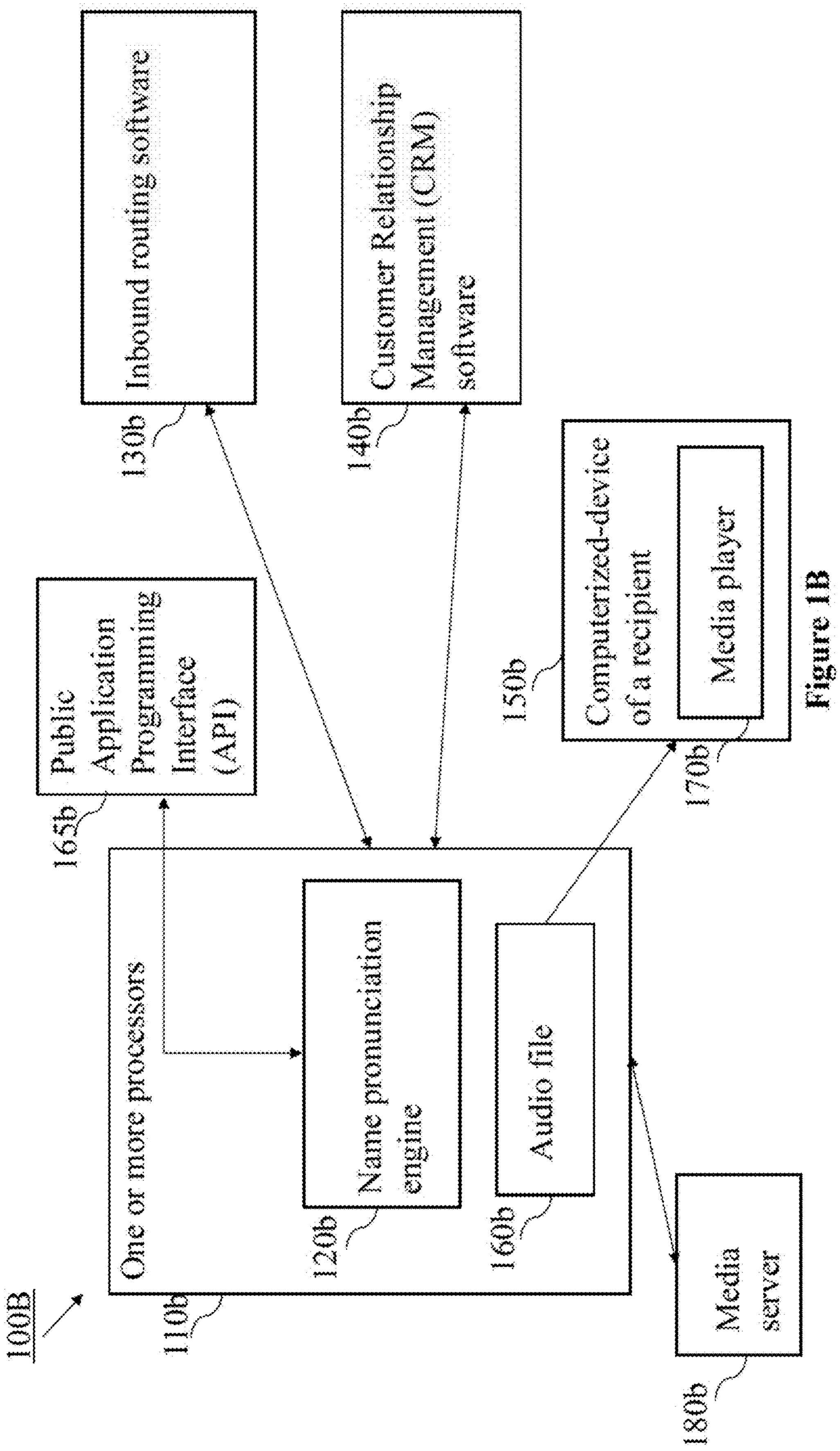

FIG. 1B schematically illustrates a high-level diagram of a system 100B for playing an audio file of a pronunciation of a name of an inbound-caller via a computerized-device of a recipient, in accordance with some embodiments of the present disclosure.

According to some embodiments of the present disclosure, system 100B may have similar components as system 100A in FIG. 1A.

According to some embodiments of the present disclosure, when there is a negative indication in the CRM software 140*b* of an audio file with the name pronunciation of the inbound-caller in the media server 180*b* then, the name pronunciation engine 120*b* may be configured to fetch the audio file 160*b* into the media server 180*b* from a public Application Programming Interface (API).

According to some embodiments of the present disclosure, the name pronunciation engine 120*b* may determine the geographical location of the inbound-caller based on the Automatic Number Identification (ANI). Based on the determined geographical location, the name of the inbound-caller in text-format may be provided to a third-party name pronunciation engine, such as, for example, NameShouts®, Microsoft String Pronunciation engine (SrgsToken.Pronunciation), Google® Text To Speech Artificial intelligence (TTS-AI) engine and the like.

According to some embodiments of the present disclosure, a pronunciation score may be increased by providing first name and last name of the inbound-caller to narrow down the search to locations where these names are more common.

Figure 1C:
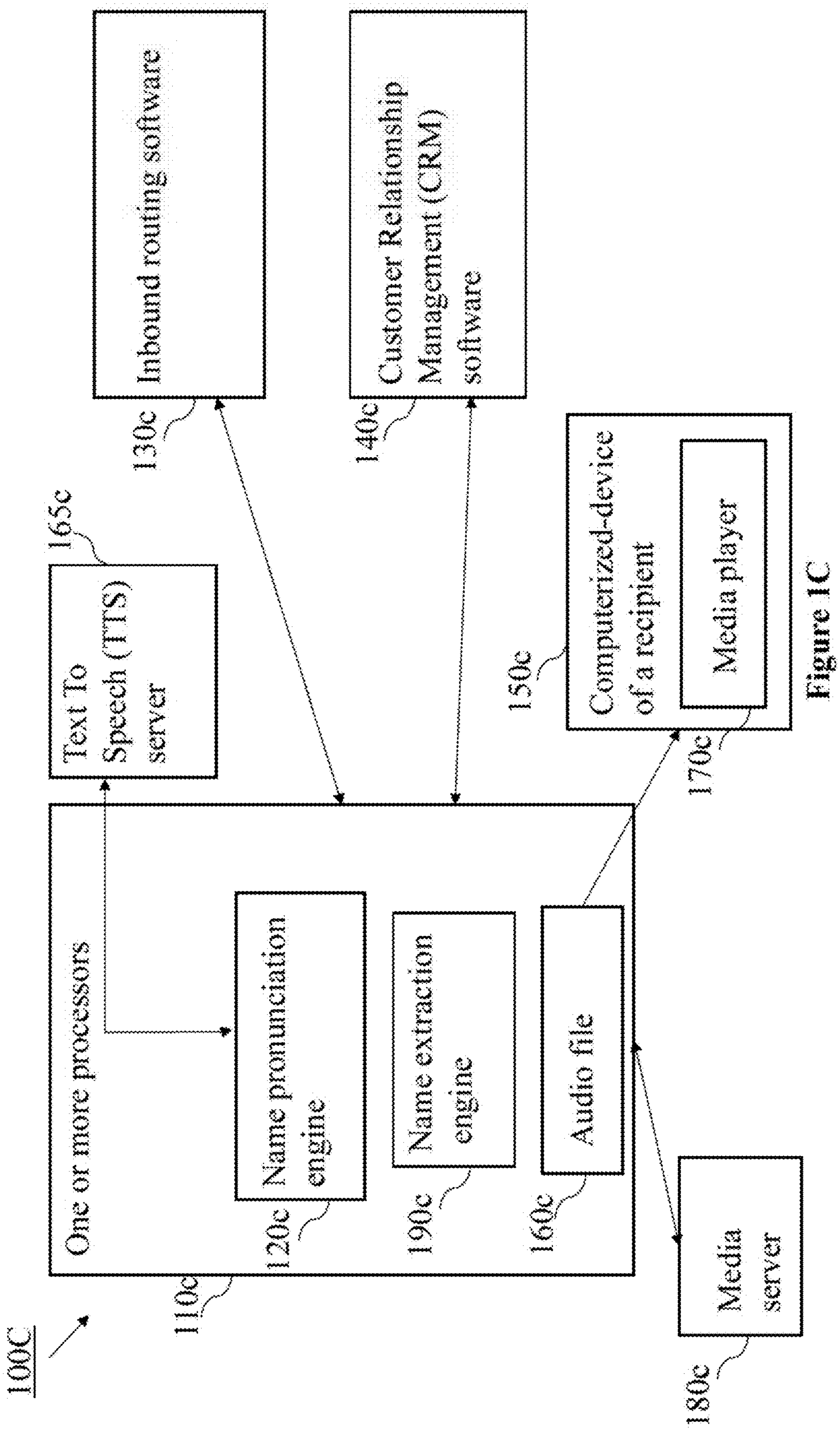

FIG. 1C schematically illustrates a high-level diagram of a system 100C for playing an audio file of a pronunciation of a name of an inbound-caller via a computerized-device of a recipient, in accordance with some embodiments of the present disclosure.

According to some embodiments of the present disclosure, system 100C may include similar components as in system 100A in FIG. 1A and as in system 100B in FIG. 1B.

According to some embodiments of the present disclosure, in some cases an audio file with the name pronunciation may not exist in the media server 180*c* and also may not be available by the third-party name pronunciation engines, e.g., public APIs 165*b* in FIG. 1B.

According to some embodiments of the present disclosure, the name pronunciation engine 120*c* may be configured to fetch the audio file 160*c* from a Text To Speech (TTS) server 165*c* when there is a negative indication of audio file existence in the CRM software 140*c*. The audio file may be generated by the TTS server 165*c* based on the name of the inbound-caller in text-format that has been received from the name pronunciation engine 120*c* and then may be stored in the media server 180*c* or any other data storage.

Figure 6:
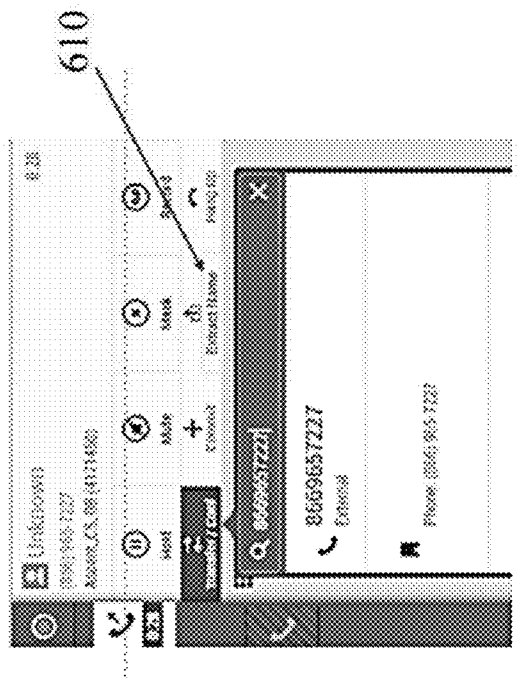
FIG. 6 is a screenshot depicting User Interface (UI) of agent with extract name feature, in accordance with some embodiments of the present disclosure.

According to some embodiments of the present disclosure, the audio file with pronunciation of the name of the inbound-caller may have been generated by the TTS server implementing a name extraction engine 190*c* after a previous interaction with the inbound-caller has been marked as not correctly pronounced or alternatively upon a user-click on an icon for name extraction in a UI, such as UI 600 in FIG. 6, which triggers the operation of the name extraction engine 190*c*.

According to some embodiments of the present disclosure, the user, i.e., the recipient of the inbound call, may click on the icon 610 in FIG. 6 when the user has mispronounced the name of the inbound-caller and afterwards the caller has mentioned the mispronunciation and the correct pronunciation of the name during the interaction.

According to some embodiments of the present disclosure, when the previous interaction with the inbound-caller has been marked as not correctly pronounced, for example, by a user-click on a button 610 in FIG. 6, the name extraction engine 190*c* may convert the audio file into transcript, e.g., phonetic transcription text detect a timestamp of a sentence in the transcript where the inbound-caller is correcting the recipient as to the pronunciation of the name.

According to some embodiments of the present disclosure, the name extraction engine 190*c* may convert the audio file into transcript and then detect a timestamp of a sentence in the transcript where the inbound-caller is correcting the recipient as to the pronunciation of the name.

According to some embodiments of the present disclosure, the name extraction engine 190*c* may extract the name of the inbound-caller from the phonetic transcription text and then use the TTS server 165*c* to convert the extracted name of the inbound-caller from the phonetic transcript text to audio file to be stored in the media server 180*c* as the audio file with pronunciation of the name of the inbound-caller. The record of the inbound-caller in the CRM software may be marked to indicate that there is an audio file with the name pronunciation of the inbound-caller. For example, as shown by table 285 in FIG. 2B.

According to some embodiments of the present disclosure, the name extraction engine 190*c* may implement Large Language Model (LLM) models where each LLM model may be finetuned to provide the results for the patterns shown and extract the phonemes for the name of the person from the patterns shared.

According to some embodiments of the present disclosure, the LLM model may be finetuned by proving the LLM model examples of extraction in the form of attribute-based annotations. These examples may be used as a guide, helping the LLM model to identify and extract the desired entities accurately for the actual data. The LLM may be provided with the examples initially to prompt it with the name extraction use cases which will help in the finetuning process. After this when actual data is passed to the LLM model, the LLM model may return the name pronunciation extracted from the transcription.

Figure 2A:
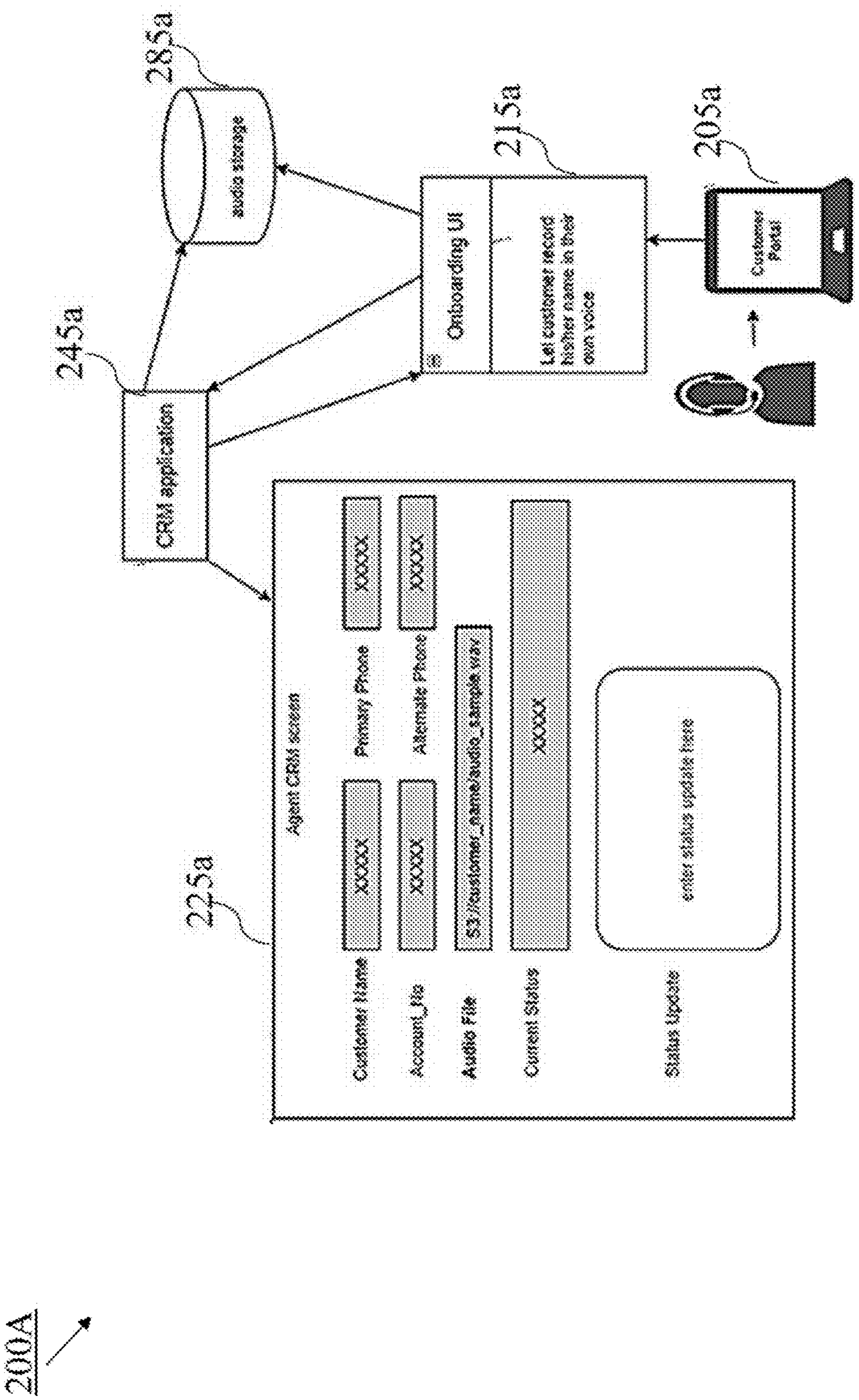
FIGS. 2A-2C schematically illustrate a high-level diagram of a system for playing an audio file of a pronunciation of a name of an inbound-caller via a computerized-device of a recipient, in accordance with some embodiments of the present disclosure.

FIG. 2A schematically illustrates a high-level diagram of a system 200A for playing an audio file of a pronunciation of a name of an inbound-caller via a computerized-device of a recipient, in accordance with some embodiments of the present disclosure.

According to some embodiments of the present disclosure, in a system, such as system 100A in FIG. 1A, a caller, e.g., customer may use the customer portal 205*a* that may be provided for example, by tenants of Contact Center as a Service (CCaaS) platform to record their name as it should be pronounced correctly.

According to some embodiments of the present disclosure, the audio recording which has caller's name pronounced in their own voice may be stored in an audio storage 285*a*, such as media server 180*a* in FIG. 1A.

According to some embodiments of the present disclosure, an indication as to the caller's recording as an audio file in the audio storage 285*a* may be stored in a CRM application 245*a*, such as CRM software 140*a* in FIG. 1A. For example, in the agent CRM screen 225*a*, there may be an indication to the presence of the audio file in the audio storage 285*a* in the form of a path to the audio file or a hyperlink.

According to some embodiments of the present disclosure, a user may have access to the audio file via the CRM application 245*a*.

Figure 2B:
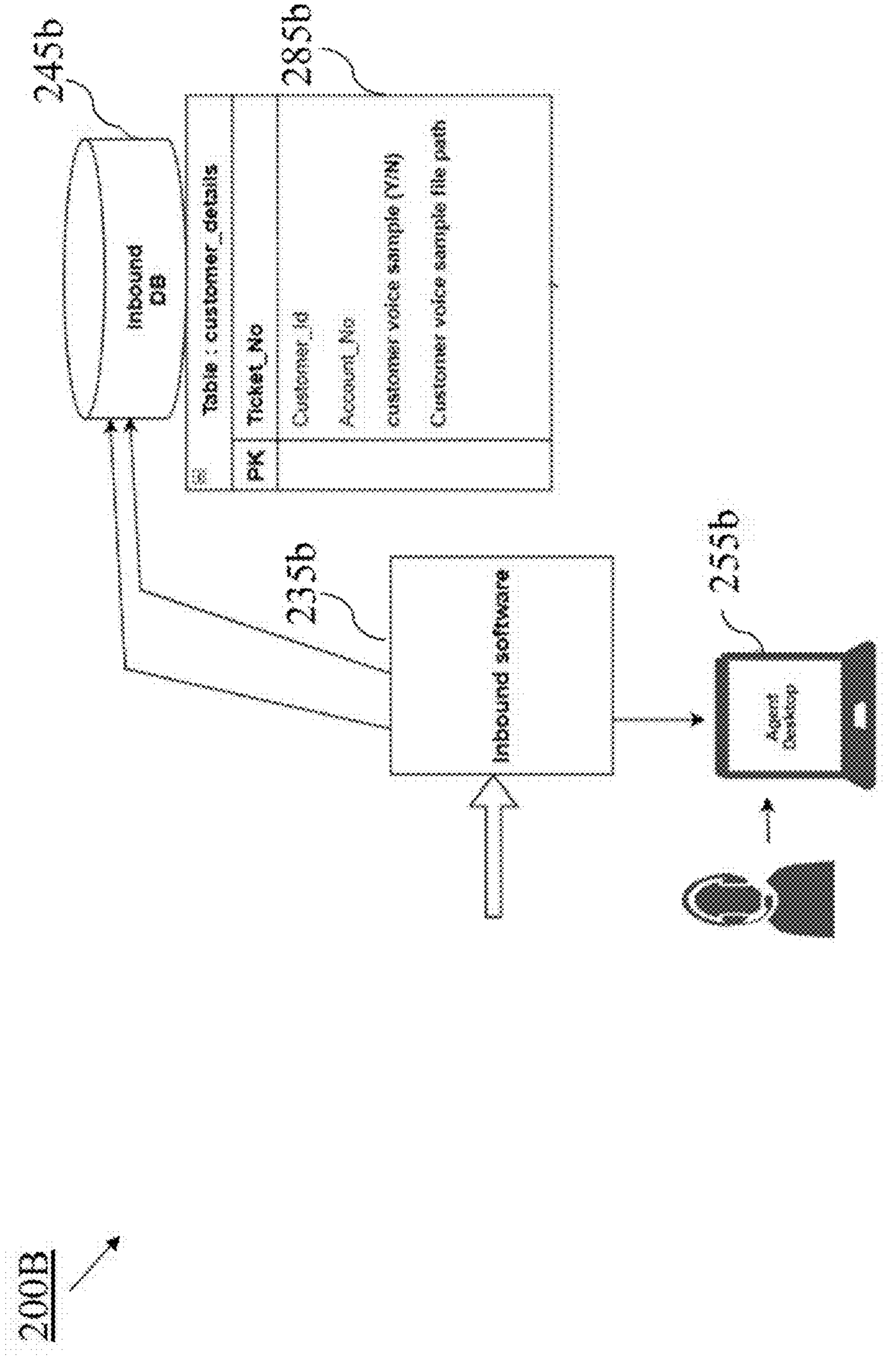

FIG. 2B schematically illustrates a high-level diagram of a system 200B for playing an audio file of a pronunciation of a name of an inbound-caller via a computerized-device of a recipient, in accordance with some embodiments of the present disclosure.

According to some embodiments of the present disclosure, in a system, such as system 100A in FIG. 1A, when an inbound-interaction reaches the inbound software 235*a*, such as inbound routing software 130*a* in FIG. 1A, the inbound software triggers different backend system processes as per the configuration of the system.

According to some embodiments of the present disclosure, via one of these processes a CRM table 285*a* of the CRM software where the caller e.g., customer details may be stored may be queried for the audio file, such as audio file 160*a* in FIG. 1A. The audio file may be retrieved from a media server, such as media server 180*a* in FIG. 1A as part of this process. When the inbound-interaction, may be connected to the recipient, e.g., agent in a contact center, the retrieved audio file may be played on the computerized-device of the recipient via a media player that is running on it. The computerized-device of the recipient may be for example, an agent desktop 255*b*.

Figure 2C:
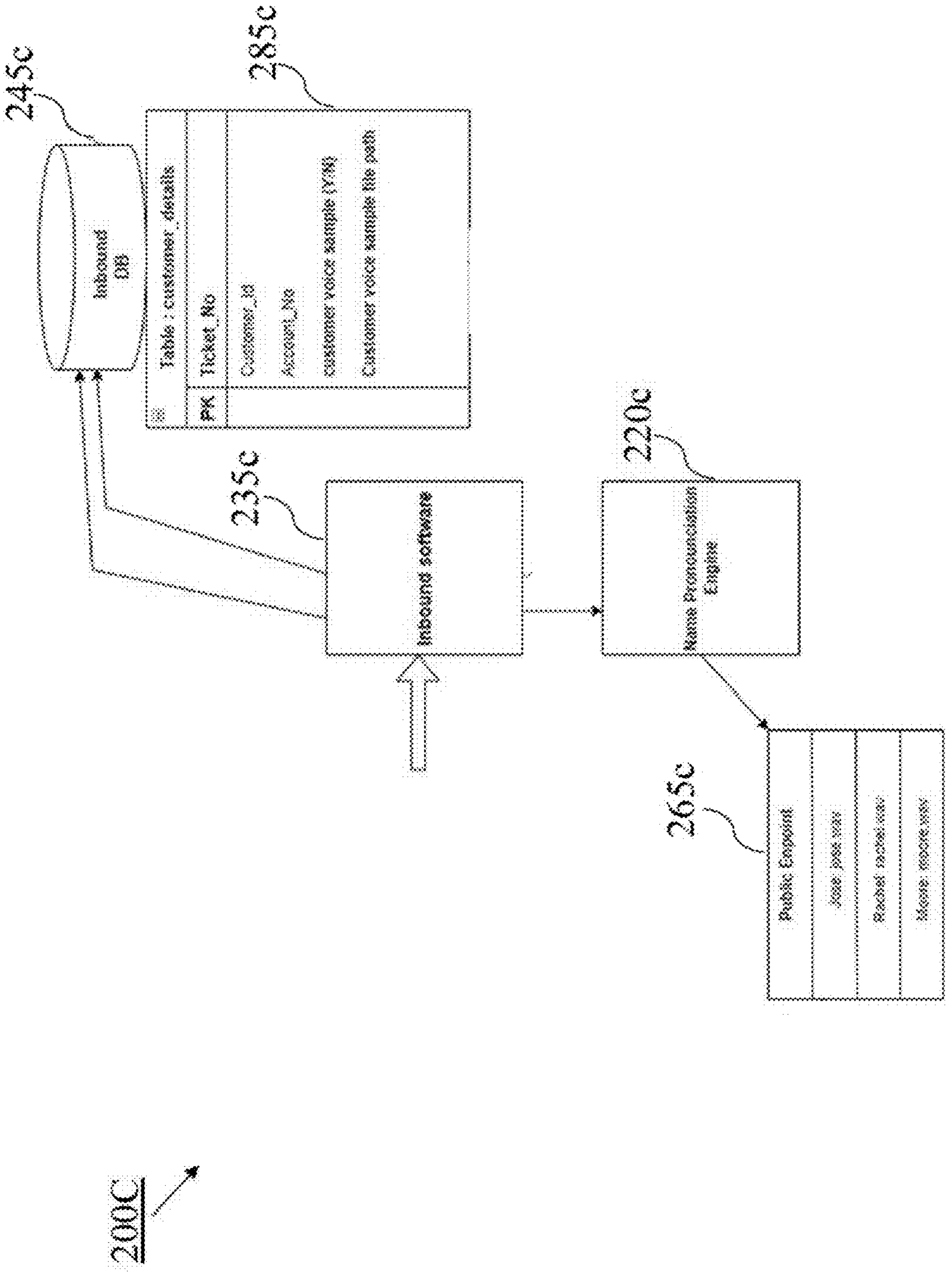

FIG. 2C schematically illustrates a high-level diagram of a system 200C for playing an audio file of a pronunciation of a name of an inbound-caller via a computerized-device of a recipient, in accordance with some embodiments of the present disclosure.

According to some embodiments of the present disclosure, in a system, such as system 100B in FIG. 1B, when an inbound-interaction enters the inbound software 235*c*, such as inbound routing software 130*b* in FIG. 1B, the inbound software 235*c* may trigger backend system processes as per the configuration of the system.

According to some embodiments of the present disclosure, one of the processes may be querying a CRM table 285*c* where customer details are stored for the audio file of the name pronunciation of the caller of the inbound-interaction. The CRM table may include an indication of the existence of the audio file in a media server, such as media server 180*b* in FIG. 1B.

According to some embodiments of the present disclosure, when there is a positive indication for the presence of the audio file with the pronunciation of the caller in the media server, then the audio file may be retrieved as part of the process. When there is a negative indication for the presence of the audio file in the media server, a name pronunciation engine 220*c*, such as name pronunciation engine 120*b* in FIG. 1B may be operated to query a public endpoint with the first and last name of the caller to receive an audio file with the correct name pronunciation.

According to some embodiments of the present disclosure, the audio file that may be received from the public end point, such as public API 165*b* in FIG. 1B, may be stored in the media server and then may be forwarded to the computerized-device of the recipient to be played by a media player before the inbound-interaction with the caller begins.

Figure 3A:
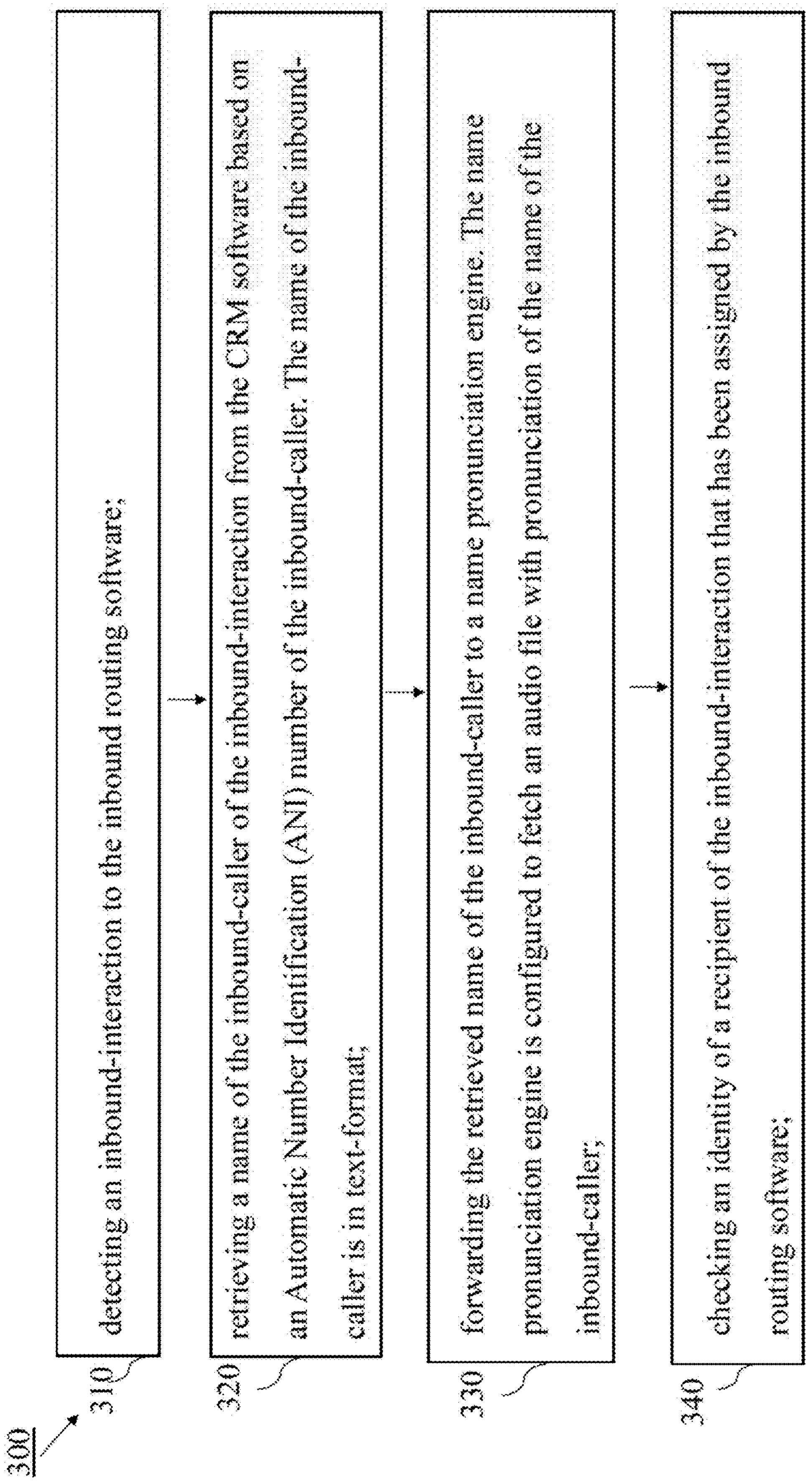
FIGS. 3A-3B schematically illustrate a high-level workflow of a computerized-method for playing an audio file of a pronunciation of a name of an inbound-caller via a computerized-device of a recipient, in accordance with some embodiments of the present disclosure.
Figure 3B:
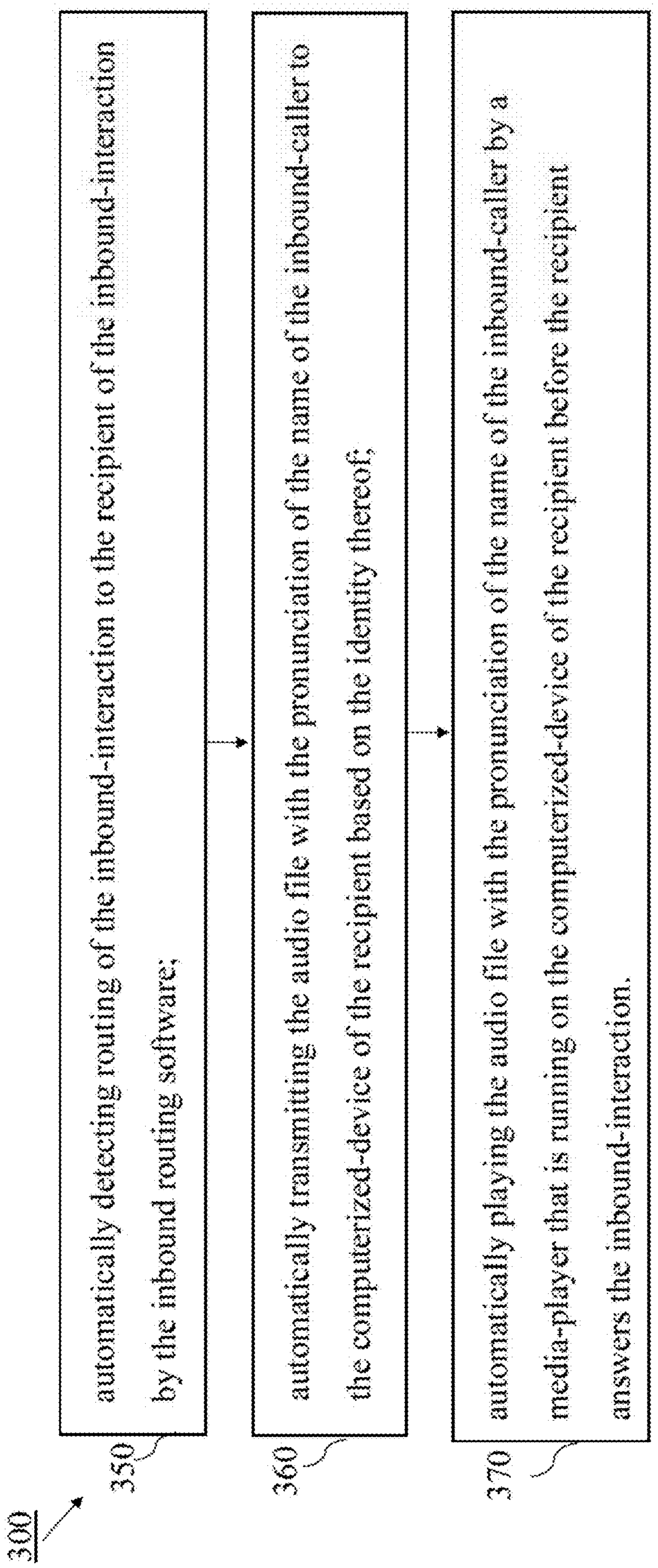

FIGS. 3A-3B schematically illustrate a high-level workflow of a computerized-method for playing an audio file of a pronunciation of a name of an inbound-caller via a computerized-device of a recipient, in accordance with some embodiments of the present disclosure.

According to some embodiments of the present disclosure, operation 310 comprising detecting an inbound-interaction to the inbound routing software.

According to some embodiments of the present disclosure, operation 320 comprising retrieving a name of the inbound-caller of the inbound-interaction from the CRM software based on an Automatic Number Identification (ANI) number of the inbound-caller. The name of the inbound-caller is in text-format.

According to some embodiments of the present disclosure, operation 330 comprising forwarding the retrieved name of the inbound-caller to a name pronunciation engine. The name pronunciation engine is configured to fetch an audio file with pronunciation of the name of the inbound-caller.

According to some embodiments of the present disclosure, operation 340 comprising checking an identity of a recipient of the inbound-interaction that has been assigned by the inbound routing software.

According to some embodiments of the present disclosure, operation 350 comprising automatically detecting routing of the inbound-interaction to the recipient of the inbound-interaction by the inbound routing software.

According to some embodiments of the present disclosure, operation 360 comprising automatically transmitting the audio file with the pronunciation of the name of the inbound-caller to the computerized-device of the recipient based on the identity thereof.

According to some embodiments of the present disclosure, operation 370 comprising automatically playing the audio file with the pronunciation of the name of the inbound-caller by a media-player that is running on the computerized-device of the recipient before the recipient answers the inbound-interaction.

Figure 4A:
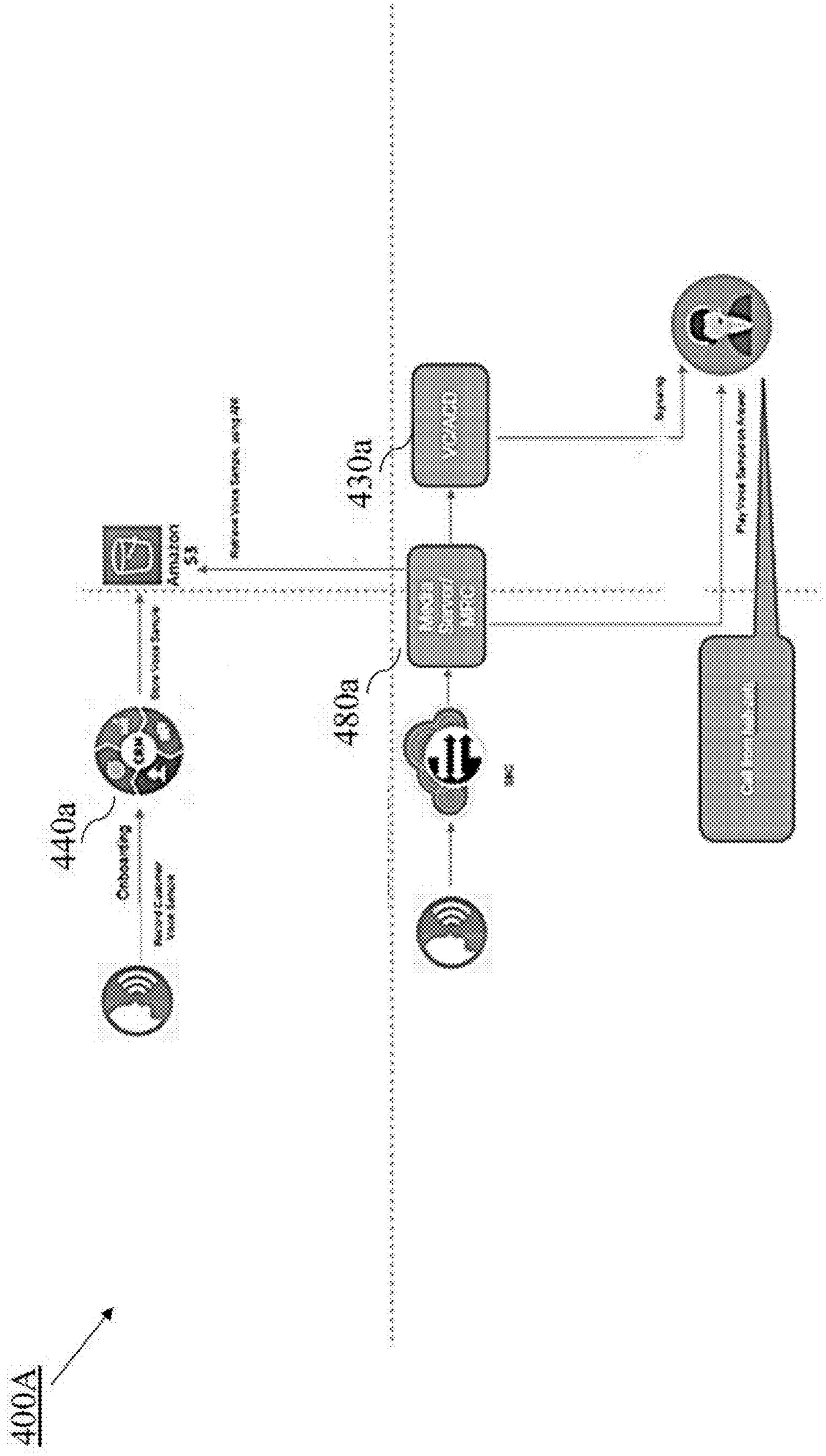
FIGS. 4A-4C schematically illustrate a high-level diagram of a system for playing an audio file of a pronunciation of a name of an inbound-caller via a computerized-device of a recipient, in accordance with some embodiments of the present disclosure.

FIG. 4A schematically illustrates a high-level diagram of a system 400A for playing an audio file of a pronunciation of a name of an inbound-caller via a computerized-device of a recipient, in accordance with some embodiments of the present disclosure.

According to some embodiments of the present disclosure, when a caller that the name pronunciation has been previously captured, dials into the CCaaS using voice as a channel of communication, from Session Border Controller (SBC) to Virtual Contact (VC), i.e., routing engine, the inbound interaction may land on a routing engine 430*a*, such as inbound routing software 130*a* in FIG. 1A.

According to some embodiments of the present disclosure, a backend business intelligence unit may dip into the backend system, e.g., Customer Relationship Management (CRM) software 440*a* to check if an audio file with the caller's name pronunciation is available in the media server 480*a*. When the audio file is available then when the ACD software 430*a* routes the inbound-interaction to the agent, a screen pop-up, as shown in FIG. 6 or any notification that let the agent know a new contact is received, may be shown on the computerized-device of the agent.

According to some embodiments of the present disclosure, before connecting the voice path between the recipient and the caller, the audio file with the voice sample may be played to the recipient via a media player to enable the recipient to correctly pronounce the name of the caller.

Figure 4B:
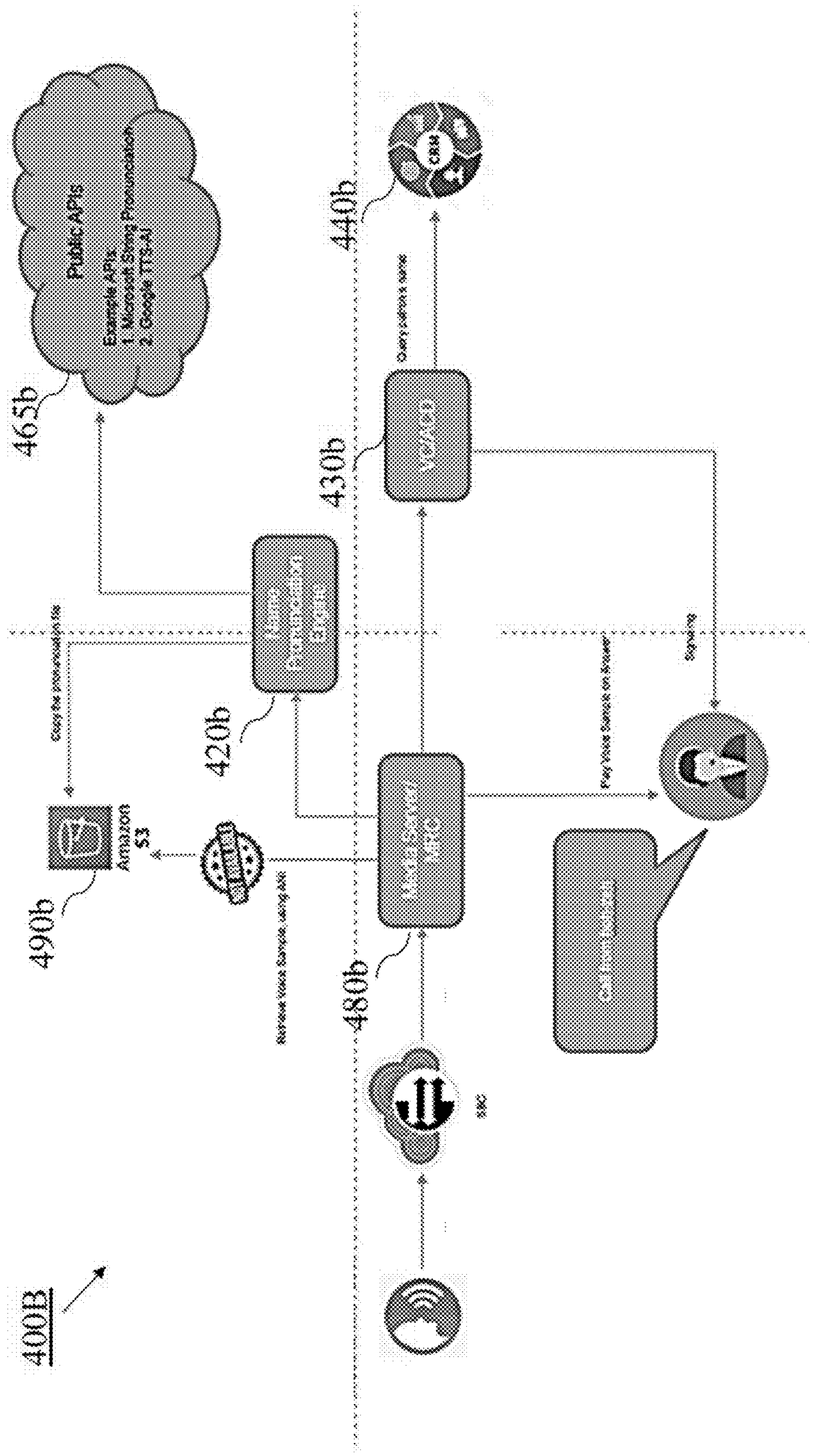

FIG. 4B schematically illustrates a high-level diagram of a system for playing an audio file of a pronunciation of a name of an inbound-caller via a computerized-device of a recipient, in accordance with some embodiments of the present disclosure.

According to some embodiments of the present disclosure, in a system, such as system 100B, when an audio file with the caller's name pronunciation is not available the name pronunciation can be looked up on the internet. To look up the name pronunciation, the ANI of the inbound-interaction may be used to decide the geographical location where the caller is situated along with the first name and last name as stored in the CRM software 440*b*.

According to some embodiments of the present disclosure, based on the geographical location and the name from the CRM software 440*b* that are provided to a third party name pronunciation engines like NameShouts® or Microsoft string pronunciation engine (Srgs Token.Pronounciation), Google® Text To Speech Artificial Intelligence (TTS-AI) engine, the third-party engine may generate an audio file with the name pronunciation. The generated audio file may be forwarded to the media server 480*b* to be stored on it.

According to some embodiments of the present disclosure, the first name and last name string in text-format may be returned by the CRM software 440*b* and provided as payload to the public APIs, 465*b* i.e., public endpoints to query for an audio file with the pronunciation of the caller's name.

According to some embodiments of the present disclosure, system 100B in FIG. 1B may be implemented in a cloud computing environment as a CCaaS. The recorded audio file may be stored in a cloud storage 490*b* and may be used for later inbound-interactions from the caller.

Figure 4C:
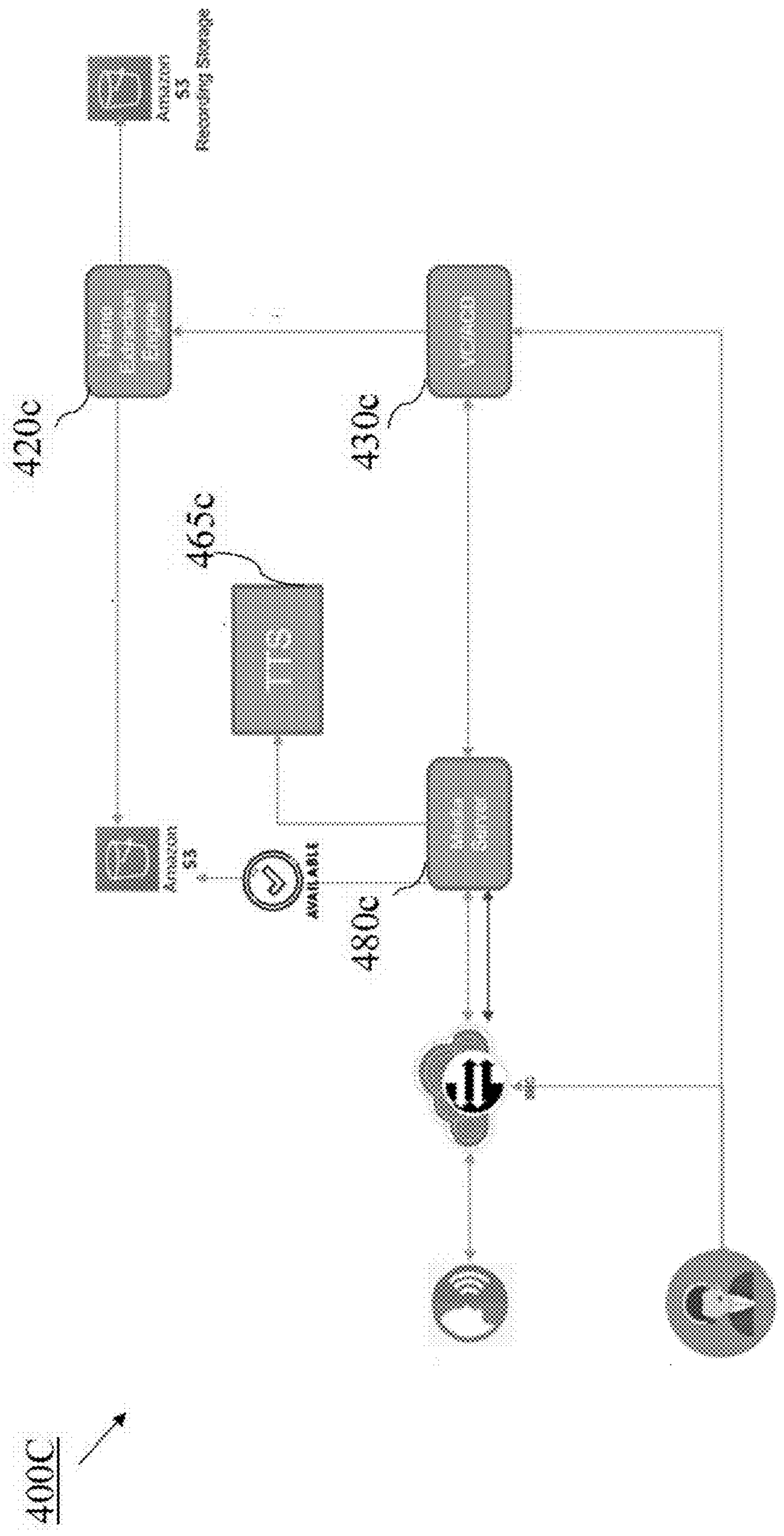

FIG. 4C schematically illustrates a high-level diagram of a system 400C for playing an audio file of a pronunciation of a name of an inbound-caller via a computerized-device of a recipient, in accordance with some embodiments of the present disclosure.

According to some embodiments of the present disclosure, in a system, such as system 100C an agent may be associated with a caller of an inbound-interaction based on skill matching and agent availability. The inbound software, such as ACD software 430*c* may find the International Phonetic Alphabet (IPA) transcription column for the caller's number in the database. There are different mechanisms of doing phonetic transcription and IPA is one of them. The IPA transcription column is the database column where the IPA transcription may be stored.

According to some embodiments of the present disclosure, when the number is found, the audio file may be retrieved from the media server 480*c*. When the number is not found the IPA transcription name may be extracted by the name extraction engine 420*c* and stored in a database. Then, the IPA transcription name may be fetched from the database by the ACD software 430*c* to the media server 480*c*.

According to some embodiments of the present disclosure, the media server 480*c* may receive the IPA transcription of the name of the inbound-caller and forward it the TTS server 465*c* to get the related audio file. The TTS 465*c* server may provide the audio file for the corresponding text.

According to some embodiments of the present disclosure, the TTS server 465*c* may generate an audio file with a speech from the transcript, IPA transcription text format and respond to the media server 480*c* with an audio file that includes the speech that corresponds to the text, e.g., IPA transcription of the name of the inbound-caller.

According to some embodiments of the present disclosure, the media server 480*c* may receive the audio file from the TTS server 465*c* and may play the audio file over RTP which is received by agent application and played on the recipient computerized device, by running a media player thereon.

According to some embodiments of the present disclosure, after playing the audio file, the agent and the customer may be linked to start the interaction. The agent may be aware to the name pronunciation of the customer and may use it for greeting the customer. When the agent doesn't correctly pronounce the name of the customer, the customer may correct the agent when the agent mentions the customer name by saying for example, "my name pronunciation is <xxx>" or "You can call me <xxx>".

According to some embodiments of the present disclosure, during the interaction, or while concluding the interaction, the agent may click on a button in the UI, for example, button 610 in FIG. 6, to call the API of the inbound software, e.g., ACD software 430*c*, to extract the name of the customer from the call recording. Accordingly, the ACD 430*c* software may trigger a process of extracting the name of the customer by operating a name extraction engine 420*c*, such as name extraction engine 190*c* in FIG. 1C. The ACD software 430*c* may pass the contact ID and contact phone number of the caller to the name extraction engine 420*c*.

According to some embodiments of the present disclosure, upon receiving the API call by the name extraction engine 420*c* the ACD 430*c* may retrieve the recording of the interaction from the recording storage. The recording storage may have the mapping of contactId of the caller with the call recording.

According to some embodiments of the present disclosure, after the retrieval of the recording of the interaction, the name extraction engine 420*c* may use a phone recognizer algorithm, such as Allosaurus algorithm for recording to IPA transcription and a finetuned LLM model for extracting the IPA transcription of the name of the inbound-caller.

According to some embodiments of the present disclosure, the name extraction engine 420*c* may store the IPA transcripted name with the contact number in the database. As the IPA transcripted name is corrected, if the call is made to or received from the same number, the VC/ACD 430*c* may be able to get the updated name pronunciation to use during the conversation.

Figure 5:
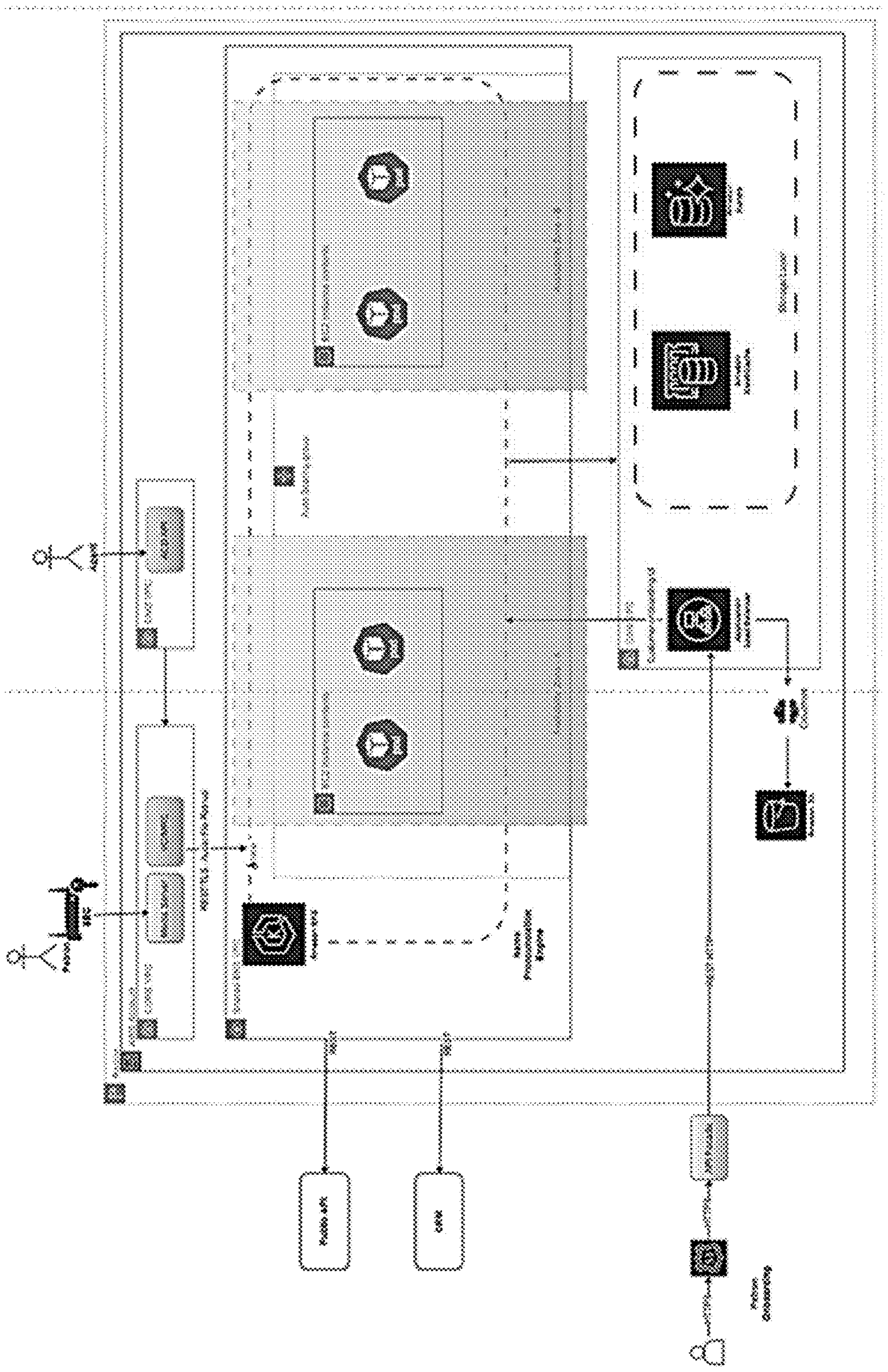
FIG. 5 schematically illustrate a high-level diagram of a system for playing an audio file of a pronunciation of a name of an inbound-caller via a computerized-device of a recipient, in accordance with some embodiments of the present disclosure.

FIG. 5 schematically illustrate a high-level diagram of a system 500 for playing an audio file of a pronunciation of a name of an inbound-caller via a computerized-device of a recipient, in accordance with some embodiments of the present disclosure.

According to some embodiments of the present disclosure, systems 100A-100C in FIGS. 1A-1C may implement the database or data storage via Amazon® AuroraDB table containing Public API Uniform Resource Locator (URL) and customer details like name. The audio files with the name pronunciation of the caller may be stored in Amazon Simple Storage Service (Amazon S3).

According to some embodiments of the present disclosure, the name pronunciation engine 190*c* in FIG. 1C may be implemented as a microservice hosted in Amazon Web Services (AWS) managed Amazon Elastic Kubernetes Service (EKS).

According to some embodiments of the present disclosure, the CRM software 140*a* in FIG. 1A may be an external Customer Relation Management (CRM) system. The public API may be the third-party public API which helps provide audio file for name pronunciation. A customer may connect to the CCaaS infrastructure for voice call via Session Border Controller (SBC).

FIG. 6 is a screenshot depicting User Interface (UI) 600 of agent with extract name feature, in accordance with some embodiments of the present disclosure.

According to some embodiments of the present disclosure, UI 600 shows inbound calls for an agent and a button 610 to extract name of the caller of an inbound-interaction upon user-click to mark the interaction for customer name extraction. For example, as operated in system 100C in FIG. 1C.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-system for playing an audio file of a pronunciation of a name of an inbound-caller via a computerized-device of a recipient, said computerized-system comprising:

an inbound routing software;

a Customer Relationship Management (CRM) software;

a name pronunciation engine; and one or more processors, said one or more processors are configured to:

(i) detect an inbound-interaction to the inbound routing software;

(ii) retrieve a name of the inbound-caller of the inbound-interaction from the CRM software based on an Automatic Number Identification (ANI) number of the inbound-caller, wherein said name of the inbound-caller is in text-format;

(iii) forward the retrieved name of the inbound-caller to a name pronunciation engine, wherein said name pronunciation engine is configured to fetch an audio file with pronunciation of the name of the inbound-caller from a media server based on a positive indication of audio file existence and file-path of the audio file in a record in the CRM software;

(iv) check an identity of a recipient of the inbound-interaction that has been assigned by the inbound routing software;

(v) automatically detect routing of the inbound-interaction to the recipient of the inbound-interaction by the inbound routing software;

(vi) automatically transmit the audio file with the pronunciation of the name of the inbound-caller to the computerized-device of the recipient based on the identity thereof; and (vii) automatically play the audio file with the pronunciation of the name of the inbound-caller by a media-player that is running on the computerized-device of the recipient before the recipient answers the inbound-interaction and before connecting a voice path between the recipient and the inbound-caller.

2. The computerized-system of claim 1, wherein said audio file with pronunciation of the name of the inbound-caller is fetched from a media server.

3. The computerized-system of claim 2, wherein the audio file with pronunciation of the name of the inbound-caller has been recorded and stored in the media server during first communication with the inbound-caller.

4. The computerized-system of claim 1, wherein the inbound routing software is an Automatic Call Distribution (ACD) software.

5. The computerized-system of claim 1, wherein said name pronunciation engine is configured to fetch the audio file from a public Application Programming Interface (API) when there is a negative indication of audio file existence in the CRM software.

6. The computerized-system of claim 1, wherein said name pronunciation engine is configured to fetch the audio file from a Text To Speech (TTS) server when there is a negative indication of audio file existence in the CRM software, wherein the audio file is generated by the TTS server based on the name of the inbound-caller in text-format that has been received from the name pronunciation engine.

7. The computerized-system of claim 6, wherein the audio file with pronunciation of the name of the inbound-caller has been generated by a name extraction engine after a previous interaction with the inbound-caller has been marked as not correctly pronounced, and wherein said name extraction engine comprising:

(i) converting the audio file into transcription;

(ii) detecting a timestamp of a sentence in the transcript where the inbound-caller is correcting the recipient as to the pronunciation of the name;

(iii) extracting the name of the inbound-caller from the transcription;

(iv) using the TTS server to convert the extracted name of the inbound-caller from the phonetic transcript text to audio file; and (v) storing the audio file with pronunciation of the name of the inbound-caller.

8. A computerized-method for playing an audio file of a pronunciation of a name of an inbound-caller via a computerized-device of a recipient, said computerized-method comprising:

(i) detecting by one or more processors an inbound-interaction to the inbound routing software;

(ii) retrieving by the one or more processors a name of the inbound-caller of the inbound-interaction from the CRM software based on an Automatic Number Identification (ANI) number of the inbound-caller, wherein said name of the inbound-caller is in text-format;

(iii) forwarding by the one or more processors the retrieved name of the inbound-caller to a name pronunciation engine, wherein said name pronunciation engine is configured to fetch an audio file with pronunciation of the name of the inbound-caller from a media server based on a positive indication of audio file existence and file-path of the audio file in a record in the CRM software;

(iv) checking by the one or more processors an identity of a recipient of the inbound-interaction that has been assigned by the inbound routing software;

(v) detecting by the one or more processors routing of the inbound-interaction to the recipient of the inbound-interaction by the inbound routing software;

(vi) automatically transmitting by the one or more processors the audio file with the pronunciation of the name of the inbound-caller to the computerized-device of the recipient based on the identity thereof; and (vii) automatically playing the audio file with the pronunciation of the name of the inbound-caller by a media-player that is running on the computerized-device of the recipient before the recipient answers the inbound-interaction and before connecting a voice path between the recipient and the inbound-caller.

* * * * *